United States Patent [19]

Brett et al.

[11] Patent Number: 4,693,786
[45] Date of Patent: Sep. 15, 1987

[54] NON-ELECTRICAL SOLVENT RECOVERY DISTILLATION APPARATUS

[75] Inventors: Dennis A. Brett, Carmel; Clay R. Runshe, Indianapolis, both of Ind.

[73] Assignee: Techserve Engineering Corp., Carmel, Ind.

[21] Appl. No.: 751,279

[22] Filed: Jul. 2, 1985

[51] Int. Cl.⁴ ............................................. B01D 3/02
[52] U.S. Cl. ..................................... 202/83; 202/170; 202/188; 202/205; 202/235; 202/266; 202/267 R; 203/86; 203/100; 203/DIG. 22; 285/8; 285/184; 285/921
[58] Field of Search ................. 202/83, 170, 187, 188, 202/189, 197, 205, 235, 163, 270, 266, 267; 203/86, DIG. 22, 99, 91, 100; 134/12, 109; 285/184, 921, 8; 159/DIG. 21, DIG. 42, DIG. 15

[56] References Cited

U.S. PATENT DOCUMENTS

| | | | |
|---|---|---|---|
| 1,636,550 | 7/1927 | Buel | 202/170 |
| 2,101,840 | 12/1937 | Dinley | 202/170 |
| 2,725,459 | 11/1955 | Currier et al. | 202/170 |
| 2,801,958 | 8/1957 | Fortenbacher et al. | 202/170 |
| 2,834,359 | 5/1958 | Kearney | 202/170 |
| 2,867,225 | 1/1959 | Zademach et al. | 202/170 |
| 2,903,243 | 9/1959 | Erwin | 159/28.1 |
| 3,028,267 | 4/1962 | Edhofer et al. | 202/170 |
| 3,350,279 | 10/1967 | Tolchin | 202/83 |
| 4,008,729 | 2/1977 | Chizinsky | 202/170 |
| 4,123,091 | 10/1978 | Cosentino et al. | 285/921 |
| 4,233,120 | 11/1980 | Finlay-Maxwell | 203/2 |
| 4,323,429 | 4/1982 | Hoover | 202/83 |
| 4,457,805 | 7/1984 | Pastor | 202/83 |
| 4,464,227 | 8/1984 | Colwell | 134/12 |
| 4,482,432 | 11/1984 | Caffes | 203/86 |
| 4,572,767 | 2/1986 | McCord | 202/70 |

OTHER PUBLICATIONS

Sales Leaflet by Finish Engineering Co., Inc., Erie, Pa, "Little Still", Series LS-15, Dated Dec. 1981.

Primary Examiner—Wilbur Bascomb
Attorney, Agent, or Firm—Woodard, Weikart, Emhardt & Naughton

[57] ABSTRACT

A portable solvent recovery distillation apparatus for improved on-site recovery of highly flammable solvent from a batch of spent solvent. Both evaporation of the spent solvent and condensation of the purified solvent vapors are conducted within a common tank under reduced pressure conditions maintained by an air-operated vacuum pump. Heating of the spent solvent is accomplished by a hot fluid circulating in indirect heat exchange relationship with the spent solvent. The apparatus is totally non-electrical for increased safety of operation.

15 Claims, 6 Drawing Figures

NON-ELECTRICAL SOLVENT RECOVERY DISTILLATION APPARATUS

BACKGROUND OF THE INVENTION

The present invention relates generally to the field of distillation devices and, more particularly, to such devices which are adapted for low volume on-site solvent recovery operations.

Reclaiming of highly flammable solvents, such as naptha, acetone, etc. by distillation procedures has been a common practice for a number of years. Such operations however, have traditionally occurred in rather large, complex facilities suited to high volumes and continuous operations. While occasionally such large facilities are justified by the volume of reclaimable spent solvents generated by on-site industrial or commercial processes, quite often the reclaimable spent solvents are transported from a large number of relatively small generators. Because of the nature of such operations, personnel involved in the operation of such facilities are skilled by virtue of previous training or experience.

Unfortunately, due to their complexity and high maintenance cost, large scale facilities, such as referred to above, are not adaptable to relatively low volume applications. As a result, there has been recent interest in developing relative low cost, portable, low volume solvent recovery distillation units for on-site reclamation. Previous designs for such units incorporate an evaporation vessel, a condensing heat exchanger and a storage vessel. The condensing heat exchanger usually comprises a coaxial tube arrangement having the cold fluid jacket surrounding the vapor communicating pipe connecting the two vessels. The rate of evaporation in such exchangers is directly related to the increase in total surface area of condensation. Obviously, for a given volume, this surface area is maximized by employing a relatively small diameter pipe which is suitably coiled to increase the total length of the pipe. Unfortunately, use of a relatively small diameter pipe results in a flow restriction and increased pressure differential along the length of the pipe. In previous distillation units of this type, the decrease in distillation rate caused by this flow restriction is compensated for by heating the spent solvent at an increased temperature. This is not energy efficient, however, and increased operating temperatures increase the risks of combustion.

The following patent references disclose distillation units specifically designed for such use:

| U.S. Pat. No. | Inventor |
|---|---|
| 4,457,805 | Pastor |
| 4,323,429 | Hoover |

U.S. Pat. No. 4,457,805 to Pastor discloses a solvent recovery device which employs a double wall tank with an electrical heating element. The heating element heats a low viscosity heating liquid disposed between the double walls of the tank. Spent solvent is contained within a removable plastic bag disposed within the tank. Purified solvent vapors created by evaporation within the tank are routed outside the tank to a double walled heat exchanger where the solvent vapors are condensed. Purified liquid solvent then gravitates to a reservoir separate from the tank. The present invention differs from the Pastor device in several important respects. For example, the Pastor device employs electrical controls which by their mere presence increase the risk of explosion of the highly flammable solvent. Further, the plastic bag in the Pastor device is an inherently inefficient medium for transferring heat from the heating liquid to the spent solvent. The present invention avoids the use of an insulating material, such as a plastic bag, between the tank wall and spent solvent. Additionally, the Pastor device employs a coiled tube double wall heat exchanger and reservoir external of the waste holding tank to condense the solvent vapors. Not only does this arrangement add to the complexity and bulkiness of the overall unit, but it also unnecessarily restricts the condensation rate of the purified solvent vapors.

U.S. Pat. No. 4,323,429 to Hoover discloses a spent solvent purification apparatus which is similar to Pastor in that it employs an electrical heating element and control system and separate evaporating and storage vessels connected by a condensing heat exchanger of the coiled tube type. Additionally, it is noted that neither the Pastor nor Hoover devices include a vacuum pump which is operable to lower the atmospheric pressure inside the evaporation and condensing units.

SUMMARY OF THE INVENTION

A portable, non-electrical solvent recovery distillation apparatus for on-site recovery of highly flammable or non-flammable solvent from a batch of spent solvent, according to one embodiment of the present invention, comprises a tank having a bottom and side walls and an open top. There is further provided a lid enclosing the open top of the tank and removable therefrom, the tank and lid having means for sealing in an air tight manner the interior of the tank. The apparatus also includes a rigid container sized and arranged to be received within the interior of the tank and to contain therein the batch of spent solvent. Additionally, there is provided an air-operated vacuum pump means for reducing the atmospheric pressure within the tank below ambient atmospheric pressure. An evaporating means is also provided for evaporating the spent solvent. The evaporating means includes a hot fluid conduit for circulating hot water or steam heated by an external heat source into indirect heat exchange relationship with the batch of spent solvent contained within the tank. The spent solvent is heated, under reduced pressure conditions created by the vacuum means, to its lowered boiling point temperature, thereby separating the purified solvent vapors from residual materials present in the spent solvent. The apparatus is further characterized by a condensing means for condensing, within the tank, the purified solvent vapors into a liquid form. The condensing means includes a cold water conduit which circulates cold water into indirect heat exchange relationship with the purified solvent vapors.

It is an object of the present invention to provide an improved solvent recovery distillation apparatus.

Another object of the present invention to provide an improved solvent recovery distillation apparatus which is totally non-electrical and therefore extremely safe in use.

It is a further object of the present invention to provide an improved solvent recovery distillation apparatus in which evaporation and condensation of the purified solvent occurs within a single tank which is designed to minimize the restriction to vapor flow while providing relatively large evaporation and condensing surfaces.

An additional object of the present invention is to provide an improved solvent recovery distillation apparatus wherein both evaporation and distillation takes place under near vacuum conditions.

It is a yet further object of the present invention to provide an improved solvent recovery distillation apparatus which employs the use of a portable rigid container allowing easy disposal of the residual material component of the spent solvent.

It is a still further object of the present invention to provide an improved solvent recovery distillation apparatus which employs the use of a portable rigid container for disposing of the residual material component of the spent solvent and which also includes a heating element which is submerged within the spent solvent inside the rigid container in order to evaporate the purified solvent component.

Related objects and advantages of the present invention will become more apparent by reference to the following figures and detailed description.

DESCRIPTION OF THE PREFERRED EMBODIMENT

Figure 1:
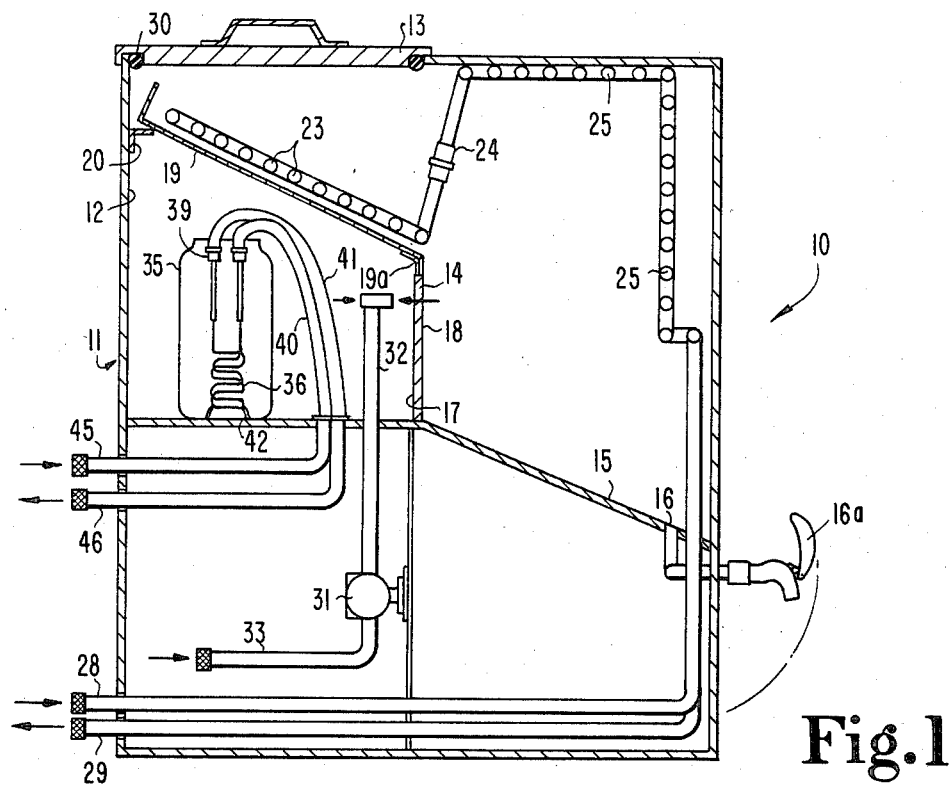
FIG. 1 is a side elevation view, in full section, of a first preferred embodiment of the solvent recovery distillation apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
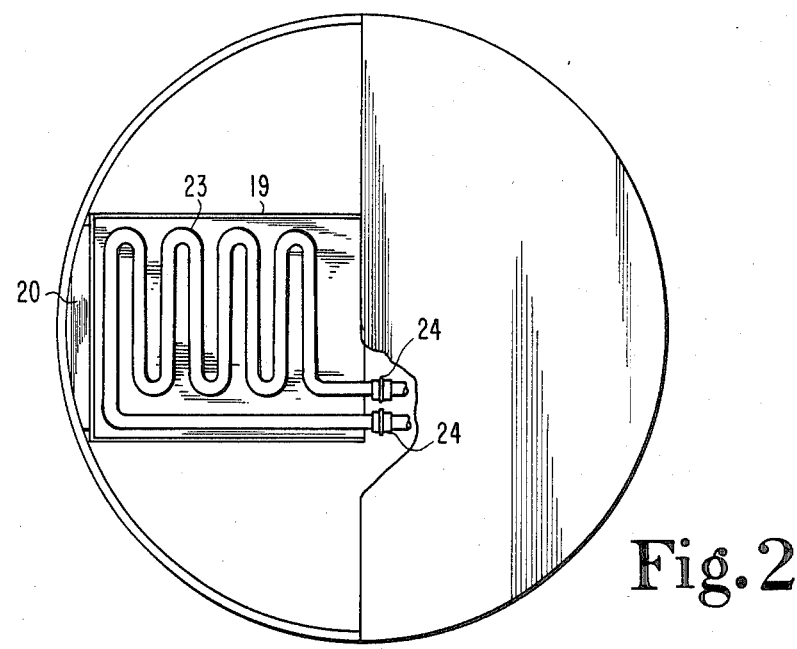
FIG. 2 is a top elevation view of the apparatus of FIG. 1 with the lid removed to show the interior of the tank.

Referring now to the drawings in detail. FIGS. 1 and 2 show a first preferred embodiment of the distillation apparatus of the present invention generally designated by the reference numeral 10. The apparatus 10 includes a generally cylindrical shaped housing 11 having a tank 12 at the upper portion thereof and a removable semicircular shaped lid 13 at the top of tank 12. An insulated divider wall 14 extends upwardly from the bottom wall 15 of tank 12 and serves to divide the tnak 12 into two separate fluid containing vessels comprising evaporating and condensing compartments 17 and 18, respectively. The bottom wall 15 is inclined downwardly towards a drain 16 which communicates with a spigot 16a mounted to swivel vertically between an operational position, in which spigot 16a extends outwardly of housing 11, and a retracted position shown in dashed lines in FIG. 3.

A tray 19 is pivotally attached to the top of divider wall 14 and is removable therefrom by conventional means schematically depicted at 19a in FIG. 1. Tray 19 is supported at the upper end by a bracket 20 mounted to the inside wall of tank 12. A series of coils 23 extend along the length of tray 19 and are connected by a pair of quick connect-disconnect couplings 24 to another series of coils 25 disposed along the top and side portions of condensing compartment 18. Coils 23 and 25 are connected in fluid communication with cold water supply and return lines 28 and 29, respectively, and provide a means for condensing purified solvent vapors within tank 12 in a manner fully described later herein.

Lid 13 is provided with a rubber gasket seal 30 which extends around the periphery of lid 13 and permits closure of the top of tank 12 in an airtight manner.

A compressed air-operated vacuum pump 31 is mounted to housing 11 under the bottom wall 15 of tank 12 and serves to lower the atmospheric pressure within tank 12 below ambient atmospheric pressure by evacuating air through intake line 32. This permits the apparatus 10 to operate at substantially lower temperatures, thus providing an increased safety factor when distilling highly flammable solvents while also permitting a greater range of solvents to be distilled. Lack of oxygen inside the apparatus 10 further reduces the opportunity for combustion. Vacuum pump 31 is driven by a motor in turn driven by compressed air received through line 33 from a suitable external source, such as for example a portable air compressor (not shown).

A disposable container 35, preferably made of a rigid plastic material, is received in the evaporating compartment 17 of tank 12 and is shaped to receive therein a batch of spent solvent material. Container 35 can be inexpensively constructed for one time use and disposal, in accordance with environmental regulations, or can be made for repeated use. If the container 35 is non-disposable, it is preferably coated on the interior surface with a suitable non-stick coating such as Teflon. A rigid tubular conduit 36 is received inside container 35 and is connected by a pair of quick connect-disconnect couplings 39 to flexible hoses 40 and 41, respectively. A plurality of legs 42 extend downwardly from conduit 36 and support conduit 36 a suitable distance above the bottom of container 35 so that the bottommost portion of conduit 36 is positioned in maximum heat exchange relation with spent solvent in container 35. Preferably, the conduit 36 is in the shape of a helical coil, although various other shapes which permit efficient heat exchange between conduit 36 and spent solvent received inside container 35 may be employed. Hoses 40 and 41 are respectively connected to evaporator supply and return lines 45 and 46 which in operation are coupled with corresponding lines to an externally located source for a suitable heating liquid, such as a hot water/steam boiler (not shown).

Conduit 36 and coils 23 and 25 are made of a material having good heat transfer characteristics, such as copper, with the outside surface coated with a suitable non-stick material, such as Teflon.

To operate the apparatus 10, a batch of spent solvent is poured into container 35. Lid 13 is opened and container 35 is placed in the evaporator compartment 17 of tank 12 with tray 19 raised to allow access therein.

Conduit 36 is then submerged into the spent solvent, tray 19 is lowered and lid 13 is closed. Vacuum pump 31 is started by setting an air-operated timer device (not shown) which controls the time period of the "run". Air inside tank 12 is evacuated through intake line 32 until the atmospheric pressure inside tank 12 is nearly fully (approximately 95%) evacuated. This substantially lowers the boiling point of the solvent material in container 35 below its atmospheric boiling point temperature. Another timer (not shown) on a vacuum pump 31 automatically shuts off vacuum pump 31 once evacuation of air within tank 12 is completed. Shutting off of vacuum pump 31 actuates control switches which open valves in hot and cold water circulation lines. Spent solvent within container 35 is heated to its boiling point temperature by heat exchange with hot water and/or steam flowing through conduit 36.

When the spent solvent reaches its boiling point temperature, purified solvent vapors rise from container 35 and are condensed by heat exchange with cold water circulating through coils 23. Some of the condensate is collected in tray 19 and flows into condensing unit compartment of tank 12. Other purified solvent vapors migrate over divider wall 14 to the condensing compartment 18 where the vapors are condensed by heat exchange with coils 25. The purified solvent condensate collects in the bottom of compartment 18 and may be emptied therefrom by opening spigot 16a. It should be understood that while not shown, a manually set timer device and mechanically operated valves and switches are provided to control the operation of vacuum pump 31 and the fluid circulation through evaporation conduit 36 and condensing coils 23 and 25. Thus, the distillation procedure is automatically discontinued when the purified solvent has been substantially separated from the residue component of the spent solvent. Once distillation is completed, conduit 36 is disattached from hoses 40 and 41 by disconnecting couplings 39, and container 35 with conduit 36 therein is removed from tank 12. The container 35 with the residue component of the spent solvent therein can be simply disposed of, while the conduit 36 is cleaned of any residue and replaced inside tank 12.

Figure 3:
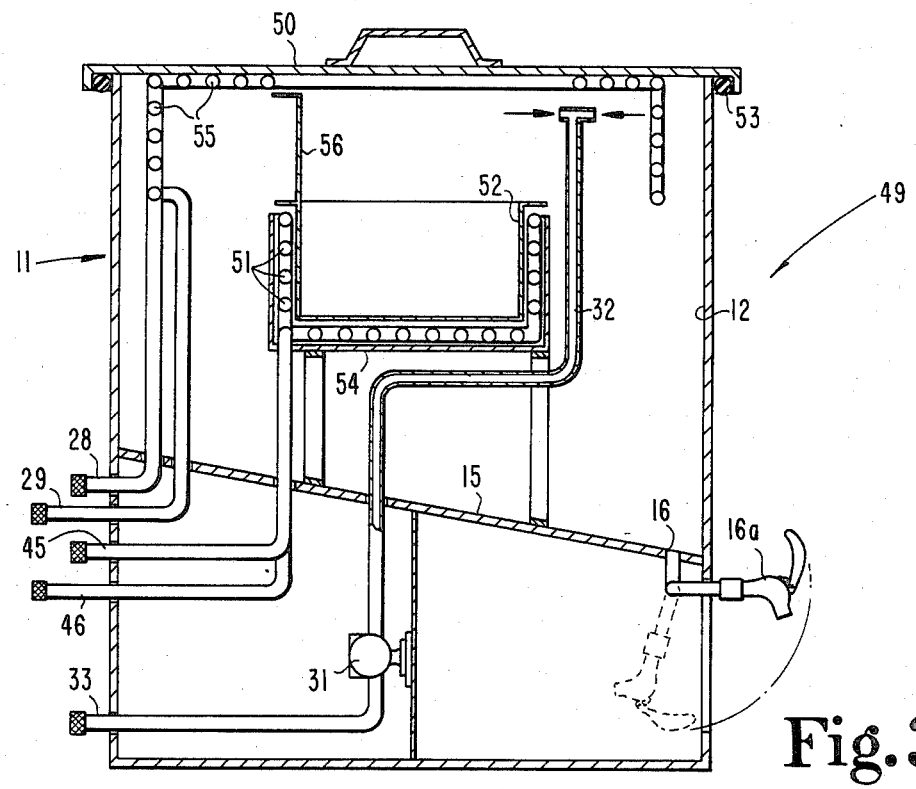
FIG. 3 is a side elevation view, in full section, of a second preferred embodiment of the solvent recovery distillation apparatus of the present invention.

FIG. 3 depicts a second preferred embodiment of the distillation apparatus. Identical reference numerals are used to identify elements similar to those in the previous preferred embodiment. In this embodiment, the apparatus 49 includes a lid 50 which is circular shaped and covers the entire top of housing 11. A compressible rubber O-ring seal 53 provides an airtight closure between lid 50 and tank 12. Notably, tank 12 is not divided into evaporating and condensing compartments. Evaporating coils 51 are centrally disposed within tank 12 and surrounds the bottom and side walls of a removable non-disposable rigid cylindrical shaped container 52 so as to define a basket within which the container is received. Condensing coils 55 extend laterally outwardly of the container 52 along the top and upper side wall of tank 12. Container 52 and evaporating coils 51 are supported above the bottom of tank 12 by rigid support frame 54 a sufficient distance to prevent container 52 and coils 51 from becomng immersed in purified solvent collecting at the bottom of tank 12. Container 52 includes a handle 56 extending vertically upwards therefrom to facilitate insertion and removal from tank 12.

In operation, the apparatus 49 is generally similar to that of the previous preferred embodiment except that heat exchange between the spent solvent and evaporating coils 51 occurs indirectly through the bottom and side walls of container 52. Thus, container 52 is preferably made of a metal material having good heat transfer characteristics. Further, container 52 is not disposable and therefore must be cleaned of the spent solvent residue after distillation. For this reason, the inside of container 52 may preferably be coated with a non-stick material, such as Teflon.

Figure 6:
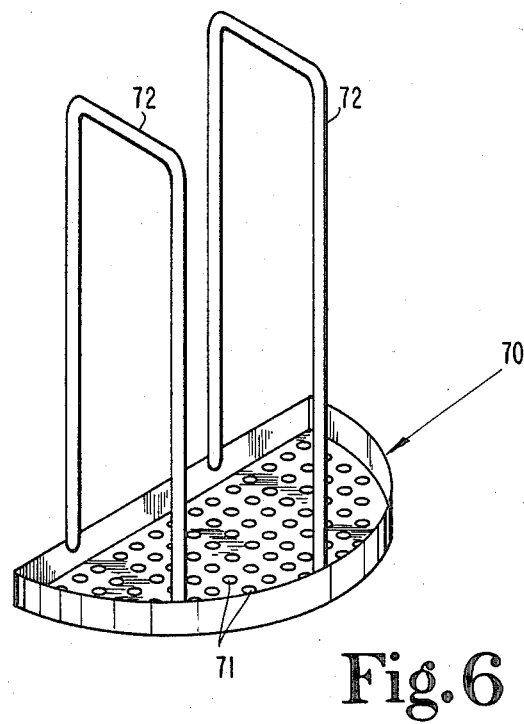
FIG. 6 is a perspective view of the solid waste removal tool used in the third preferred embodiment shown in FIGS. 4 and 5.
Figure 5:
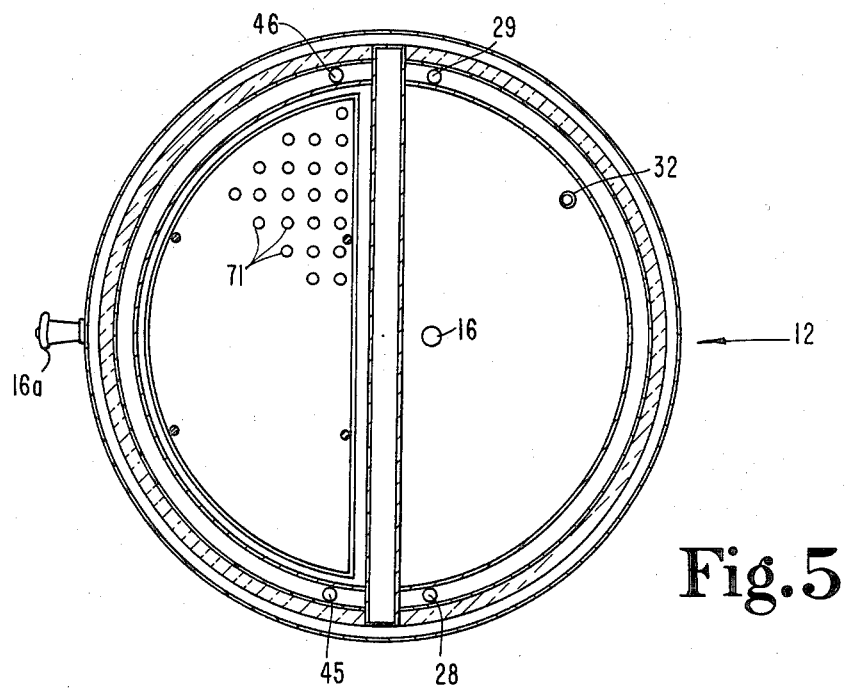
FIG. 5 is a section view taken along lines 5—5 in FIG. 4.
Figure 4:
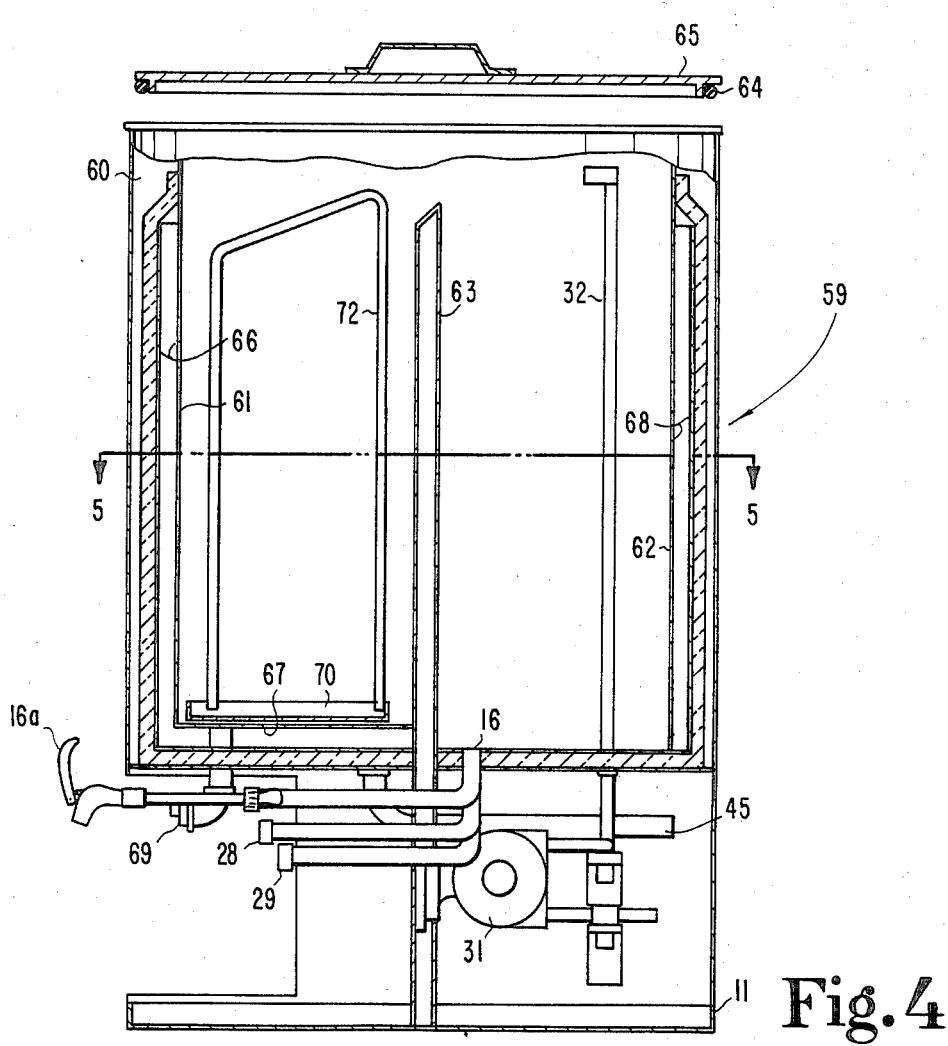
FIG. 4 is a side elevation view, mostly in section, of a third preferred embodiment of the solvent recovery distillation apparatus of the present invention.

FIGS. 4–6 depict a third preferred embodiment of the distillation apparatus generally designated by the reference numeral 59. Again, identical reference numerals are used where appropriate to identify elements similar to those in the previous preferred embodiments. In this embodiment, tank 60 has a double wall construction. Tank 60 has an open top which is closed in an airtight manner by a circular lid 65 provided with an O-ring seal 64.

Similarly to the first preferred embodiment, tank 60 is divided into two separate fluid containing vessels, evaporating and condensing compartments 61 and 62 respectively, by an insulated divider wall 63 which extends upwardly from the bottom of tank 60. Divider wall 63 and lid 65 define an opening therebetween through which purified solvent vapors rising from the evaporating compartment 61 migrate to condensing compartment 62. The size of the opening can be made larger than the surface area for evaporation in compartment 61, in which case there is no restriction to vapor flow within the apparatus. It has been found, however, that evaporation rate substantially higher than previous units of this type are achieved with an opening sized approximately one-third the size of the evaporation surface area.

Hot water and/or steam from an external source circulates in the space between the side and bottom double walls 66 and 67, respectively, of evaporating compartment 61. A drain 69 is provided at the bottom of evaporating compartment 61 to allow draining of any residue from this compartment. Cold water from an external source circulates between the side double walls 68 of condensing compartment 62. Inside evaporating compartment 61 is received a rigid metal basket 70, shown in FIG. 6. Basket 70 is sized and shaped to conform to the cross sectional contour of evaporating compartment 61. The bottom of basket 70 is provided with an array of openings 71 which are sized to allow solvent to flow through the bottom of basket 70 but yet to contain the solid or semi-solid residual component of the spent solvent which remains after distillation is completed. A pair of handles 72 extend upwardly from the basket 70, integral therewith, to facilitate insertion and removal of basket 70 from compartment 61. In operation, spent solvent is poured directly into the evaporating compartment 61 with basket 70 received in the bottom of thereof. Distillation proceeds in the manner previously described and, after distillation is completed, basket 70 is removed from tank 12 to dispose of the spent solvent residue. The bottom of basket 70 may be coated with a suitable non-stick material, such as Teflon, to facilitate cleaning of basket 70.

While the invention has been illustrated and described in detail in the drawings and foregoing description, the same is to be considered as illustrative and not restrictive to character, it being understood that only the preferred embodiment has been shown and described and that all changes and modifications that come within the spirit of the invention are desired to be protected.

What is claimed is:

1. A portable, non-electrical solvent recovery distillation apparatus for on-site recovery of purified solvent from a batch of spent flammable solvent, comprising:
   a tank having bottom and side walls and an open top;
   a lid enclosing the open top of said tank and removable therefrom, said tank and lid including means for sealing in an air tight manner the interior of said tank;
   a portable rigid container removably received within the interior of said tank to contain therein said batch of spent flammable solvent;
   a non-electrical vacuum pump means for reducing the atmospheric pressure within said tank below ambient atmospheric pressure;
   a non-electrical evaporating means, including a hot fluid conduit mounted within said tank and operable to circulate a hot fluid into indirect heat exchange relationship with the batch of spent flammable solvent contained within said rigid container, for evaporating said spent flammable solvent under reduced atmospheric conditions within said tank created by said vacuum pump means by heating said spent flammable solvent to its boiling point termperature, thereby separating purified solvent vapors from residual materials present in the spent flammable solvent; and
   a non-electrical condensing means, including a cold fluid conduit operable to circulate cold fluid into indirect heat exchange relationship with said purified solvent vapors, for condensing within said tank the purified solvent vapors into a liquid form.

2. The apparatus of claim 1 wherein said hot fluid conduit of said evaporating mean includes a heating element, said heating element arranged to be at least partially submerged within said batch of spent flammable solvent contained with said rigid container.

3. The apparatus of claim 1 wherein said tank includes a divider wall extending across said tank and upwardly from the bottom of said tank, said divider wall dividing said tank into evaporating and condensing compartments, said divider and lid defining an opening therebetween for allowing migration of said purified solvent vapors from said evaporating compartment to said condensing compartment.

4. The apparatus of claim 3 wherein said condensing means further includes a removable tray extending at least partially across the evaporating compartment of said tank and above said rigid container, said tray inclined downwardly towards said condensing compartment, at least a portion of said cold fluid conduit of said condensing means extending along and above said tray.

5. The apparatus of claim 2 wherein said submerged portion of said hot fluid conduit is coated with a non-stick material.

6. The apparatus of claim 2 wherein said submerged portion of said hot fluid conduit includes a plurality of legs adapted to support said submerged portion of said hot fluid conduit above the bottom of said rigid container.

7. The apparatus of claim 5 wherein said hot fluid conduit includes a plurality of quick connect-disconnect fittings mounted along the length thereof, said fittings allowing said submerged portion of said hot fluid conduit to be disconnected from said hot fluid conduit and removed from said apparatus.

8. The apparatus of claim 7 wherein said cold fluid conduit includes a plurality of quick connect-disconnect fittings mounted along the length thereof and operable to permit said portion of said cold fluid conduit extending along and above said tray to be disconnected from said cold fluid conduit.

9. The apparatus of claim 8 wherein said tray is pivotally and removably mounted to said divider wall.

10. The apparatus of claim 1 wherein said hot fluid conduit of said evaporating means defines a basket which receives therein and supports said rigid container.

11. The apparatus of claim 10 wherein said rigid container has a containing surface which is coated with a non-stick coating.

12. A portable, non-electrical solvent recovery distillation apparatus for on-site recovery of purified solvent from a batch of spent flammable solvent, comprising:
   a tank having bottom and side walls and an open top;
   a lid closing the open top of said tank and removable therefom, said tank and lid including means for sealing in an air tight manner the interior of said tank, said tank including a divider wall dividing the interior of said tank into separate liquid containing evaporating and condensing compartments, said evaporating compartment sized and arranged to contain therein said batch of spent flammable solvent, said divider and lid defining an opening therebetween for allowing migration of said purified solvent vapors from said evaporating compartment to said condensing compartment;
   a non-electrical vacuum pump means for reducing the atmospheric pressure within said tank below ambient atmospheric pressure;
   a non-electrical evaporating means for evaporating and spent flammable solvent received within the evaporating compartment of said tank, under reduced atmospheric conditions created by said vacuum pump means, by heating said spent flammable solvent to its boiling point temperature, thereby separating purified solvent vapors from residual materials present in the spent flammable solvent; and
   a non-electrical condensing means for condensing, within said tank, the purified solvent vapors into a liquid form.

13. The apparatus of claim 12 wherein said evaporating means includes a hot fluid conduit mounted within said tank and operable to circulate a hot fluid into indirect heat exchange relationship with the batch of spent flammable solvent contained within the evaporating compartment of said tank and said condensing means includes a cold fluid conduit mounted within said tank and operable to circulate a cold fluid into indirect heat exchange relationship with the purified solvent vapors.

14. The apparatus of claim 13 and further comprising:
   a portable rigid container removably received within the evaporating compartment of said tank and containing therein at least the residual materials present in said batch of spent flammable solvent.

15. The apparatus of claim 3 wherein the size of the opening between said divider wall and said lid is at least about one third the cross sectional area of said evaporating compartment.

* * * * *